United States Patent [19]

Sugiyama

[11] Patent Number: 5,217,179
[45] Date of Patent: Jun. 8, 1993

[54] PHOTOGRAPHIC FILM CASSETTE HAVING LIGHT TRAPPING MEMBERS

[75] Inventor: Nobuo Sugiyama, Kanagawa, Japan

[73] Assignee: Fuji Photo Film Co., Ltd., Kanagawa, Japan

[21] Appl. No.: 880,001

[22] Filed: May 8, 1992

[30] Foreign Application Priority Data

May 10, 1991 [JP] Japan .................................. 3-135711

[51] Int. Cl.$^5$ .......................................... G03B 17/26
[52] U.S. Cl. .................................. 242/71.1; 354/277
[58] Field of Search ................ 156/69, 308.2, 309.6, 156/320; 242/71, 71.1, 71.7, 71.8, 55, 53; 354/275, 277; 352/75, 78 R

[56] References Cited

U.S. PATENT DOCUMENTS

| 4,568,590 | 2/1986 | Iwai | 354/275 X |
| 4,730,778 | 3/1988 | Akao et al. | 242/71.1 X |
| 4,787,506 | 11/1988 | Akao | 242/71.1 X |
| 4,834,306 | 5/1989 | Robertson et al. | 242/71.1 |
| 4,846,418 | 7/1989 | Fairman | 242/71.1 |
| 5,098,492 | 3/1992 | Hoffacker et al. | 156/69 |
| 5,181,671 | 1/1993 | Mizuno | 242/71.1 |

FOREIGN PATENT DOCUMENTS

| 0453864 | 10/1991 | European Pat. Off. | 359/275 |
| 63-49756 | 3/1988 | Japan | 242/71 |
| 3-37645 | 2/1991 | Japan . | |

Primary Examiner—Daniel P. Stodola
Assistant Examiner—John P. Darling
Attorney, Agent, or Firm—Sughrue, Mion, Zinn, Macpeak & Seas

[57] ABSTRACT

A photographic film cassette has light-trapping members adhered to the upper and lower inner surfaces of a port portion of a plastic-molded cassette shell by a heat-activated type crystallization delay adhesive. The adhesive has properties that its stickiness is revealed by heat application and maintained for one second or more at temperatures equal to a heat-distortion temperature of the cassette shell, and its crystallization is advanced in a gradual manner. The adhesive is applied to the back surfaces of the light-trapping members. After the light-trapping members are heated, they are cooled down to a temperature equal to the heat-distortion temperature of the plastic cassette shell and attached to the port portion.

13 Claims, 2 Drawing Sheets

PHOTOGRAPHIC FILM CASSETTE HAVING LIGHT TRAPPING MEMBERS

BACKGROUND OF THE INVENTION

1. Field of the Invention

The present invention relates to a photographic film cassette and more particularly to a photographic film cassette which has a plastic molded cassette shell and light-trapping members adhered to the upper and lower inner surfaces of the port portion of the cassette shell.

2. Description of the Related Art

Conventional 135-type (35 mm) photographic film cassettes have a cylindrical housing and a pair of end caps which are formed of a thin metal plate. Such a photographic film cassette has a film passage mouth formed in its port portion. In order to prevent ambient light from entering the film cassette through the film passage mouth and damaging photographic film contained therein, light-trapping members are adhered to the upper and lower inner surfaces of the port portion. Since the metal is heat resistant, the light-trapping members are adhered thereto by a hot-melt adhesive.

Self advancing type photographic film cassettes are also well known. U.S. Pat. Nos. 4,834,306 and 4,846,418 and Japanese Patent Laid-Open Publication No. 3-37645 all disclose film cassettes in which the leading end of a photographic film is initially located inside a cassette shell prior to use and advanced out of the cassette shell by rotation of the spool. In those film cassettes, the cassette shell is molded of a plastic material, or the like. In general, plastics are not highly resistant to heat. Therefore, it is preferable not to use a thermal adhesion method when attaching light-trapping members to such a cassette shell.

For this reason, a bonding method is utilized in which a heat-activated type adhesive layer, including metallic powder, is applied to the back surfaces of light-trapping members. The adhesive elements of the adhesive layer are activated by radio frequency induction heating so as to adhere the light trapping members to the cassette shell without damaging the same. Also, the use of an adhesive which has enough adhesive power at room temperature has been tried.

In the former, when cutting the light-trapping members from a web with the metallic powder into a predetermined size, metallic dust is yielded, which causes scratches of the film. In the latter, it is impossible to entirely prevent the adhesive from oozing out of the adhesive area. Further, if the adhesive is of the hygroscopic curing type, it is difficult to control moisture during handling of webs and thus the adhesive may not cure properly. If it is the anaerobic type or the ultraviolet curing type, complete elimination of air after adhesion or the efficient irradiation of ultraviolet rays, respectively, is also very difficult.

SUMMARY OF THE INVENTION

It is an object of the present invention to provide a photographic film cassette wherein light-trapping members are attached by a sufficient adhesive force to a cassette shell without causing heat distortion to the shell. It is another object of the present invention to provide a photographic film cassette wherein an adhesive applied to light-trapping members never oozes out of the adhesive area so as to damage the film.

To achieve the above and other objects, a photographic film cassette of the present invention has light-trapping members adhered to upper and lower inner surfaces of a port portion of a plastic-molded cassette shell by means of a heat-activated type crystallization delay adhesive. Such an adhesive has a sticky condition even when cooled below the heat-distortion temperature of the plastic-molded cassette shell. This sticky condition is maintained for one second or more. After adhesion, its crystallization progresses gradually to make the adhesive harden. The adhesive includes a polymer, plasticizer and tackifier. However, the plasticizer or the tackifier can be eliminated depending on the type of polymer selected.

The light-trapping members are cut from a web and heated to activate the adhesive coated at the back surface thereof. Heat-activated temperatures of the adhesive are 110° or more. In order to prevent the plastic-molded cassette shell from heat distortion, the light-trapping members are then cooled to a temperature below the heat-distortion temperature of the plastic-molded cassette and thereafter are adhered to the port portion while the sticky condition of the adhesive remains. Polystyrene is used as a plastic material of the cassette shell, for example, and its heat-distortion temperature is 80° C. (Japanese Industrial Standard K-7207).

According to the present invention, the adhesive has a sufficient adhesive force and is stabilized after its crystallization, so that displacement of the light-trapping members is prevented and the sticky condition of the adhesive will not appear after crystallization. Further, the handling and preservation of a web coated with the adhesive is easy and the adhesive will not induce chemical or physical transformation of photographic films or light-trapping members. Accordingly, a photographic film cassette with light-trapping members having excellent adhesive and light-trapping functions is realized.

BRIEF DESCRIPTION OF THE DRAWINGS

The above and other objects and advantages will become apparent from the following description of preferred embodiments with reference to the accompanying drawings wherein.

DETAILED DESCRIPTION OF THE EMBODIMENTS

Figure 1:
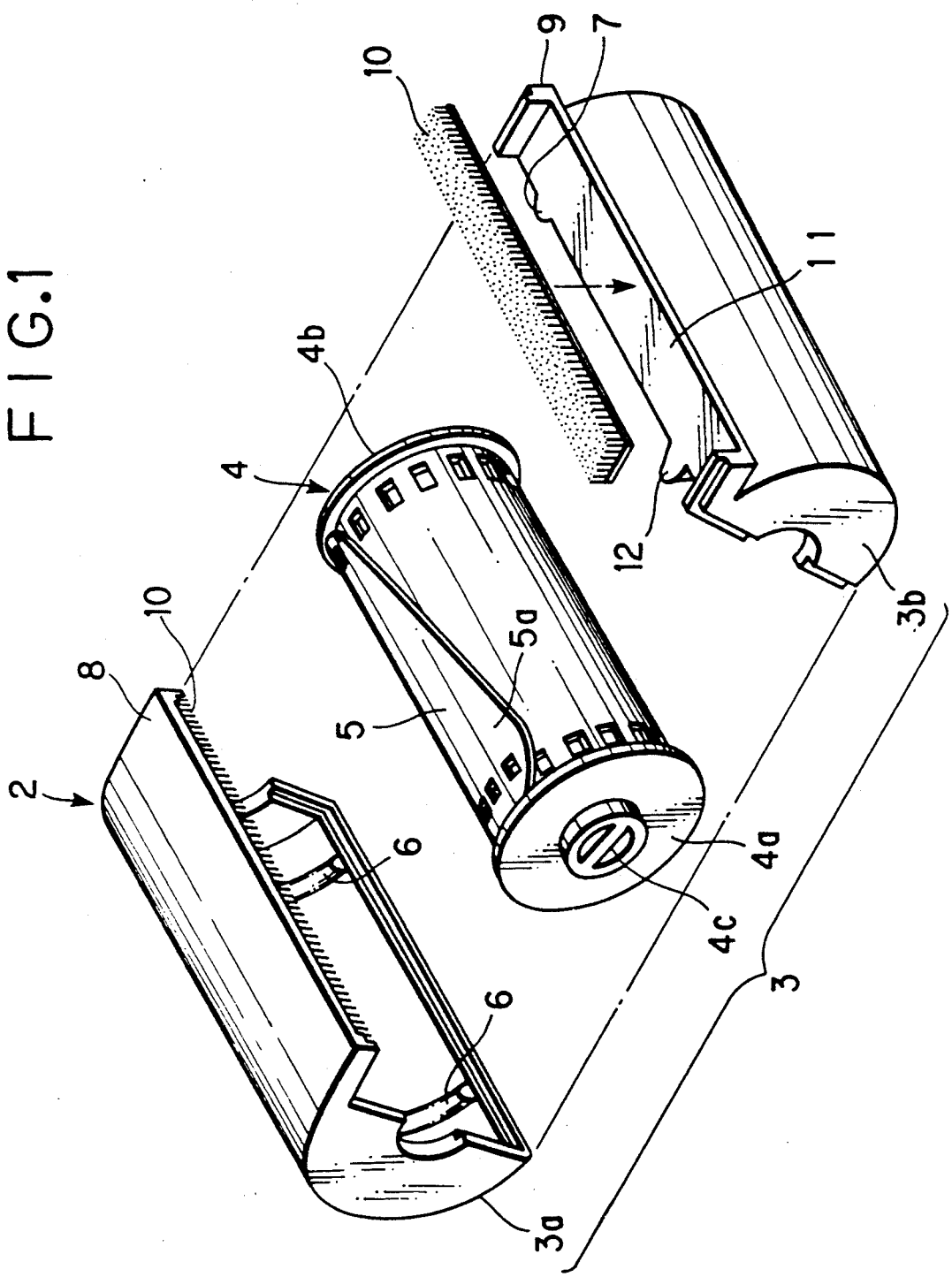
FIG. 1 is an exploded perspective view of a photographic film cassette according to an embodiment of the present invention.

In FIG. 1, a photographic film cassette 2 has a polystyrene cassette shell 3, a spool 4 contained rotatably in the cassette shell 3 and a photographic film 5 rolled on the spool 4. The cassette shell 3 consists of plastic-molded shell halves 3a and 3b which are integrated by ultrasonic welding, or the like. The photographic film 5 is wound tightly on the spool 4 and is accommodated in the cassette shell 3. At this time, the outermost convolution of the rolled photographic film 5 is pressed by circumferential ridges 6 and 7 formed integrally on the inner surfaces of the shell halves 3a and 3b. This construction serves to prevent the roll of photographic film 5 from loosening.

The respective shell halves 3a and 3b have protrusive port portions 8 and 9 which define a passageway for the photographic film 5. Light-trapping members 10 are adhered to the respective upper and lower inner surfaces of the port portions 8 and 9 so as to be in opposition to each other. The port portions 8 and 9 are mated to define a film passage mouth 11 on their respective ends. Since the port portions 8 and 9 have the light-trapping members 10 adhered thereto, external light is prevented from entering the cassette shell 3 through the film passage mouth 11. A separation claw 12 is formed on the innermost portion of the port portion 9.

Upon loading the photographic film cassette 2 in a camera (not shown), a keying formed in an extension 4c of the spool 4 is coupled with a fork (not shown) in the camera. Accordingly, as the spool 4 is rotated clockwise by the fork, the rolled photographic film 5 rotates in the same direction together with the spool 4 since the photographic film 5 is rolled tightly on the spool 4. A leading end 5a of the photographic film 5 is gradually moved to a position proximate the film passage mouth 11, and then separated by the separation claw 12. Further rotation of the spool 4 causes the leading end 5a to be advanced through the film passage mouth 11, to the outside of the cassette shell 3, between the light-trapping members 10.

Figure 2:
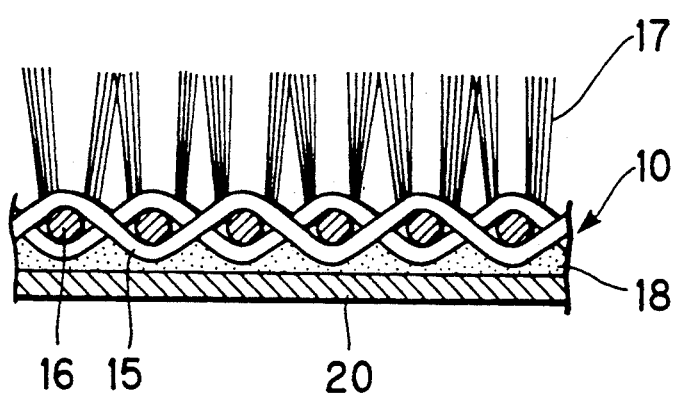
FIG. 2 is a cross section illustrating a portion of a light-trapping member to be attached to the film cassette.

As illustrated, in FIG. 2, the light-trapping members 10 are adhered to the inner surfaces of the port portions 8 and 9. The light-trapping members 10 are cut from a web to a predetermined size. The web is a pile woven fabric which comprises weft threads 15, warp threads 16 and pile threads 17 inlaid in the warp threads 16. Each one of weft, warp and pile threads consists of a plurality of filaments of polyester. The ends of the pile threads 17 are sheared off to a constant length by a shearing machine, and then blushed to be fluffy. The light-trapping members 10 cut from the web are adhered to the inner surfaces of the port portions 8 and 9 so as to face and overlap each other thereby providing a light-trapping function.

The back surfaces of the web are coated with a filler 18 and a heat-activated type crystallization delay adhesive 20 is provided on the filler 18. The adhesive 20 is activated by heat in so as to be in a tacky state. Even though the adhesive 20 is removed from the heat source, crystallization does not occur instantly, but gradually. It takes a few hours, or days, for the adhesive 20 to return to its previous condition prior to the application of the heat.

The adhesive 20 includes a polymer as a base, a solid plasticizer and a tackifier. Depending on the selection of the polymer, the solid plasticizer or the tackifier need not always be included. The polymer, the solid plasticizer or the tackifier can be selected from among the following types.

Polymer:
polyvinyl acetate, polymethacrylate butyl, vinyl chloride-vinylidene chloride copolymer, synthetic rubber, vinyl acetate-acrylic acid 2-ethylhexyl copolymer, vinyl acetate-ethylene copolymer, vinyl pyrrolidone-styrne copolymer, styrene-butadiene copolymer, vinyl pyrrolidone-ethyl acrylate copolymer amorphous polyolefin, polyurethane.

Plasticizer:
diphenyl phthalate, dihexyl phthalate, dicyclohexyl phthalate, dihydroabietyl phthalate, isophthalic acid dimethyl, sucrose benzoate, ethyleneglycol dibenzoate, trimethylolethane tribenzoate, glyceride tribenzoate, pentaerythritol tetrabenzoate, sucrose octacetate, tricyclohexyl citrate, N-cyclohexyl-P-toluenesulfonamide. Dicyclohexyl phthalate is most preferable.

Tackifier:
rosin derivative (rosin, polymer rosin, water-added rosin, glycerins of those, esters of those with pentaerythritol and dimer resinate), terpene resin system, petroleum resin system, phenol resin system, xylene resin system.

The polymer is the main source for the stickiness and adhesion of the heat-activated type crystallization delay adhesive 20. The tackifier serves to enhance the adhesive force of the heat-activated crystallization delay adhesive 20 when heated. The solid plasticizer is a solid body and does not impart plasticity to the polymer at room temperature. When the solid plasticizer is heated, it is dissolved to melt and expand the polymer so as to create the adhesive state of the polymer. After dissolution, the plasticizer is crystallized slowly so as to lengthen a time in which the adhesive 20 maintains its tackiness. This lengthened period of a sticky condition facilitates the attachment of the light-trapping members 10 to the port portions 8 and 9.

The following are examples which clearly illustrate the present invention.

SAMPLE I

A FF-DS adhesive (trade name: RINTEC Co., Ltd.) was used as the adhesive 20. After the FF-DS adhesive was melted in water, it was applied to the back surface of a web in a solid layer 60 g/m$^2$ thick and then dried. The web was cut out to form the light-trapping members 10 of 5.5 mm $\times$ 38 mm, which were then heated by a hot air of 150° C. for 5 seconds so as to activate the adhesive 20. After cooling at room temperature, the two light-trapping members 10 were pressed against the upper and lower inner surfaces of the port portions 8 and 9 of the shell halves 3a and 3b for one second so as to be adhered thereto. Thereafter, the cassette shell halves 3a and 3b and the spool 4 with the photographic film 5 rolled thereon were all assembled to obtain the photographic film cassette 3. The cassette shell 3 is formed of polystyrene.

SAMPLE II

A FF-1 adhesive (trade name: SOKEN CHEMICAL Co., Ltd.) was used as the adhesive 20. After the FF-1 adhesive was melted in water, it was applied to the back surface of a web in a solid layer 100 g/m$^2$ thick and then dried. The web was processed in the same procedure as Sample 1 and the photographic film cassette 2 was assembled.

SAMPLE III

A DH597B adhesive (trade name: NOGAWA CHEMICAL CO., Ltd.) was used as the adhesive 20. After the Dh597B adhesive was melted in water, it was applied to the back surface of a web in a solid layer 140 g/m$^2$ and then dried. The web was processed in the same procedure as the above and the photographic film cassette 2 was assembled.

Photographic film cassettes 2 of Samples I to III were each subjected to a test of unwinding and winding the photographic film 5 by rotations of the spool 4. As a result of the tests, it was confirmed that the light-trapping members 10 of each film cassette 2 were not displaced or peeled off and the operations of unwinding and winding the photographic film 5 could be performed smoothly. Also, no sticky portion was observed in the vicinity of the film passage mouth 11 and the inner surfaces of the port portions 8 and 9, and no damage was inflicted to the photographic film 5. Further, when each web of Samples I to III was unrolled after having been rolled for a period of time, no handling or preservation problems, such as blocking, occurred.

In order to avoid deformation of the cassette shell 3 caused by heat when attaching the light-trapping members 10 to the cassette shell 3, it is necessary to determine the exact heat-distortion temperature of the polystyrene (e.g., high impact-resistant polystyrene, etc. or the like), used as the material for the cassette shell 3 as well as to determine how long the light-trapping members 10 must be cooled after heat application. For measurement of the heat-distortion temperature, the Japanese Industrial Standard (JIS) K-7207-1983 (measuring method of deflection cannot be permitted in order to reliably advance the photographic film 5 out of the cassette shell 3. Therefore, the JIS K-7207-1983 method is more preferable than American Society for Testing Materials (ASTM):D-648 or JIS K-7206 method since the JIS K-7207-1983 method deals with measurement of distortions in a low temperature range.

The light-trapping members 10 of the above embodiment may be used not only for the photographic film cassette in FIG. 1 but also for any plastic cases, such as magazines, with an outlet for containing a photographic paper. The heat-activated type crystallization delay adhesive according to the present invention is used to attach the light-trapping members to the outlet of the magazine. Further, various fabrics such as pile knitted fabrics or non-woven fabrics may be used for the light-trapping members 10.

It is to be understood that the present invention can be changed, altered and modified to various forms without departing from the scope of the invention as defined in the appended claims.

What is claimed is:

1. A photographic film cassette comprising:
   a spool having a photographic film wound in a roll thereon:
   a plastic-molded cassette shell, said spool being rotatably contained therein:
   a port portion formed on said cassette shell, said port portion defining a film passage mouth, a leading end of said photographic film being advanced out of said cassette shell through said film passage mouth when said spool is rotated;
   light-trapping members configured to prevent light from entering said cassette shell through said film passage mouth, said light-trapping members being disposed on respective upper and lower inner surfaces of said port portion; and
   a heat-activated type crystallization delay adhesive disposed between said light-trapping members and said upper and lower inner surfaces respectively so as to adhere said light-trapping members to said upper and lower inner surfaces respectively, said heat-activated type crystallization delay adhesive is of a type that becomes sticky when heated and maintains a sticky state for at least one second at temperatures equal to or less than a heat-distortion temperature of the plastic-molded cassette shell, and crystallization thereof is gradually advanced to increase an adhesive force of said adhesive.

2. A photographic film cassette as defined in claim 1, wherein said light-trapping members are coated at back surfaces thereof with said heat-activated type crystallization delay adhesive, said back surfaces being adhered to said upper and lower inner surfaces of said port portion after being cooled to a temperature equal to or below the heat-distortion temperature of said plastic-molded cassette shell.

3. A photographic film cassette as defined in claim 2, further comprising:
   a pair of circumferential ridges formed inside said cassette shell for preventing loosening of said roll of photographic film and a pair of separation claws for separating said leading end from an outermost convolution of said roll of photographic film.

4. A photographic film cassette as defined in claim 2, wherein said heat-activated type crystallization delay adhesive contains a polymer.

5. A photographic film cassette as defined in claim 4, wherein said polymer is selected from the group consisting of polyvinyl acetate, polymethacrylate butyl, vinyl chloride-vinylidene chloride copolymer, synthetic rubber, vinyl acetate-acrylic acid 2-ethylhexyl copolymer, vinyl acetate-ethylene copolymer, vinyl pyrrolidone-styrene copolymer, styrene-butadiene copolymer, vinyl pyrrolidone-ethel acrylate copolymer, amorphous polyolefin and polyurethane.

6. A photographic film cassette as defined in claim 4, wherein said heat-activated type crystallization delay adhesive further contains a plasticizer.

7. A photographic film cassette as defined in claim 6, wherein said plasticizer is selected from the group consisting of diphenyl phthalate, dihexyl phthalate, dicyclohexyl phthalate, dihydroabietyl phthalate, isophthalic acid dimethyl, sucrose benzoate, ehtyleneglycol dibenzoate, trimethylolethane tribenzoate, sucrose octacetate, tricyclohexyl citrate, and N-cyclohexyl-P-toluenesulfonamide.

8. A photographic film cassette as defined in claim 6, wherein said heat-activated type crystallization delay adhesive contains a tackifier.

9. A photographic film cassette as defined in claim 8, wherein said tackifier is selected from the group consisting of rosin derivative, terpene resin system, petroleum resin system, phenol resin system and xylene resin system.

10. A photographic film cassette as defined in claim 2, wherein back surfaces of said light-trapping members are coated with a filler, said heat-activated type crystallization delay adhesive being applied over said filler.

11. A photographic film cassette as defined in claim 10, wherein said light-trapping members are knitted fabrics with pile threads.

12. A photographic film cassette as defined in claim 10, wherein said light-trapping members are woven fabrics with pile threads.

13. A photographic film cassette as defined in claim 10, wherein said light-trapping members are non-woven fabrics.

* * * * *